July 1, 1958   M. GINZBURG   2,841,069
VENTILATING DEVICE FOR VEHICLES
Filed July 18, 1952   2 Sheets-Sheet 1
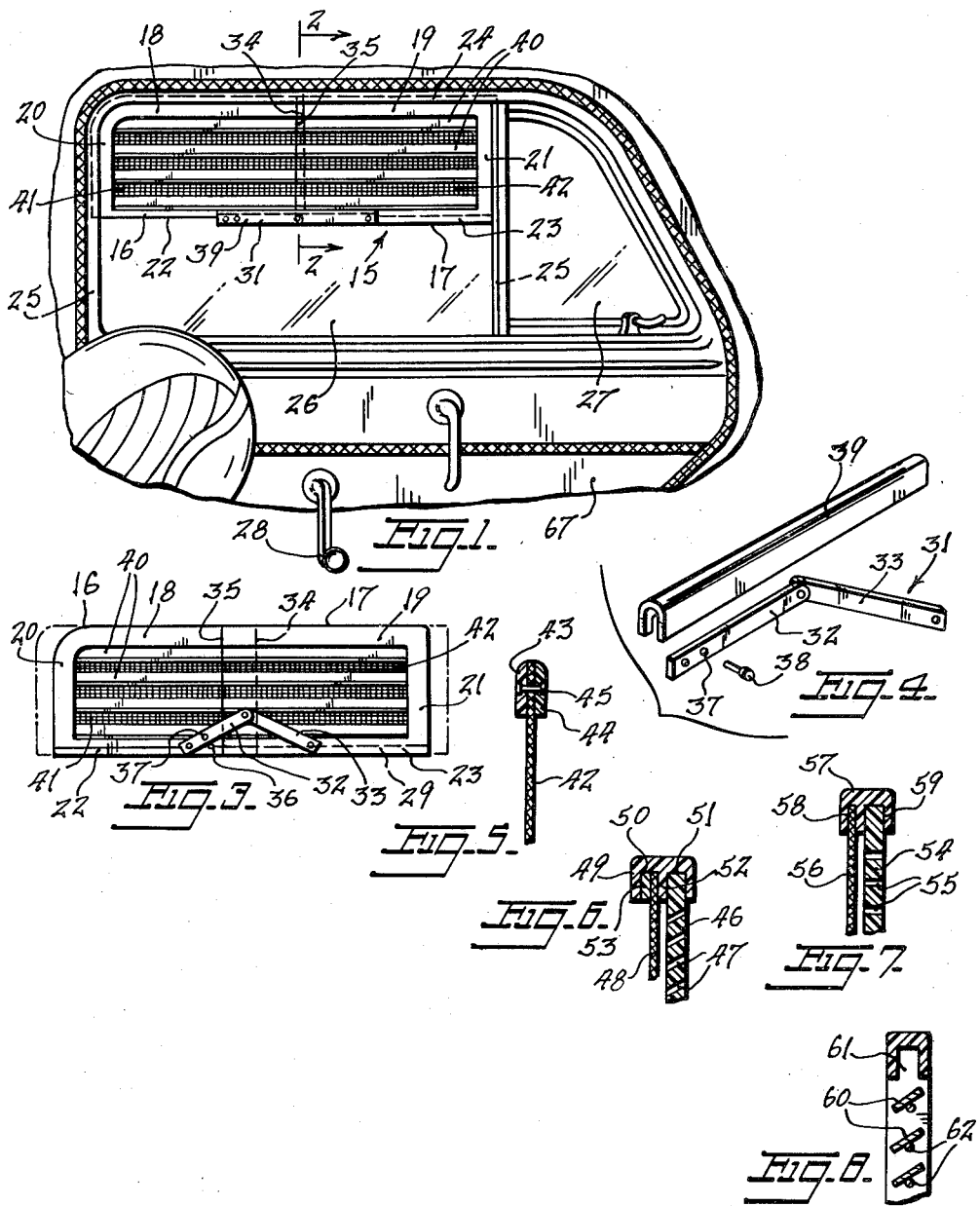
INVENTOR.
MILTON GINZBURG
BY
ATTORNEY July 1, 1958  M. GINZBURG  2,841,069
VENTILATING DEVICE FOR VEHICLES
Filed July 18, 1952  2 Sheets-Sheet 2

INVENTOR.
MILTON GINZBURG
BY
*ATTORNEY*

United States Patent Office 2,841,069
Patented July 1, 1958

2,841,069

VENTILATING DEVICE FOR VEHICLES

Milton Ginzburg, New Hyde Park, N. Y.

Application July 18, 1952, Serial No. 299,688

1 Claim. (Cl. 98—2)

This invention relates to new and useful improvements in ventilating devices for vehicles.

More particularly, the present invention proposes the construction of a ventilating device or screen for use in roll glass windows of vehicles such as automobiles to direct and control air flow within the vehicle for ventilating purposes and to screen the air for removal of foreign matter and insects.

Another object of the present invention proposes the construction of an automobile window screen having novel insertion means and a novel locking device to hold the screen in an automobile window.

Still another object of the present invention proposes forming a ventilating device with a perforated shield of transparent material adapted to deflect and reduce or check sun glare.

Still further, the present invention proposes constructing the ventilating device with pivotally mounted louvers for adjustable control of air flow through the ventilating device and into a vehicle so that any desired amount of fresh air may be induced into the vehicle without drafts.

As a further object, the present invention proposes arranging the ventilating device structure so that a screen and louvers are interchangeable for maximum efficiency when the vehicle is not in motion and its occupants are sitting or sleeping therein.

Another object of the present invention is to provide a ventilating device for vehicle roll glass windows which is easy to make, easy to insert and remove but which will be securely held in a window once inserted.

For further comprehension of the invention and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a pictorial view illustrating the ventilating device of the present invention inserted in an automobile window, the glass being partly rolled down.

Fig. 3 is an elevational view of the ventilating structure per se with the parts in position for insertion in a window and the fully inserted position indicated in dot-dash outline.

Fig. 4 is a perspective view of the insertion brace, locking pin and cover shown in the several figures.

Fig. 5 is a fragmentary sectional detail view generally similar to Fig. 2 but illustrating a modification of the present invention.

Figs. 6, 7 and 8 are views similar to Fig. 5 but showing further modifications of the present invention.

Figure 2:
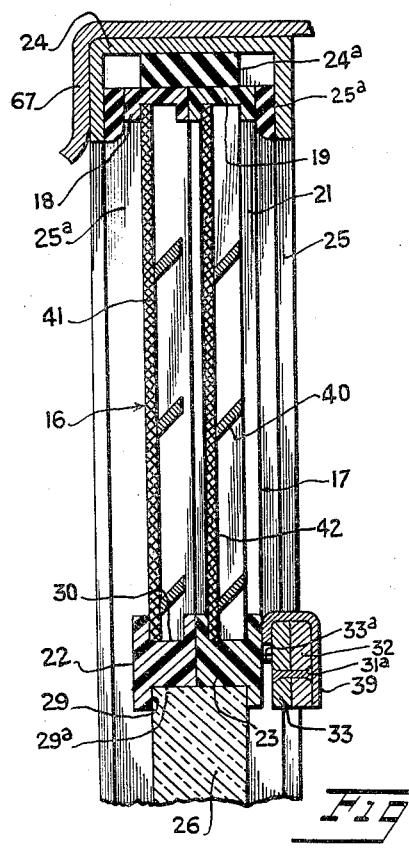
Fig. 2 is a sectional view taken on line 2—2 of Fig. 1.

The ventilating device, in accordance with the first form of the invention illustrated in Figs. 1 to 3, inclusive, has a frame 15 made in two generally U-shaped sections 16 and 17. The sections 16 and 17 have respectively upper arms 18 and 19, ends 20 and 21, and lower arms 22 and 23. Upper arms 18 and 19 and the end pieces 20 and 21 are adapted to fit within a vehicle roll glass window casing 24 in place of the glass window pane 26, the glass being partially rolled down as shown in Fig. 1. Window casing 24 is provided with the usual glass runs 25 in which the window glass 26 is vertically reciprocable. The upper portion of casing 24 and runs 25 are channel-shaped and are lined with the usual rubber strips 24ª and 25ª.

While frame 15 is shown as inserted in an automobile window having a sliding glass portion 26 and a pivoted window portion 27, the frame may be made to fit any vehicle window.

The lower arms 22 and 23 of the frame sections 16 and 17 are adapted for abutment with the top edge of window glass 26, the glass being rolled up by handle 28 until it abuts the frame and holds it in place. An inverted U-shape groove 29 is provided by rabbets 29ª formed in the lower arms 22 and 23 to receive the top edge of the window glass 26.

An inwardly facing channel 30 is also provided in each of the frame sections 16 and 17.

Frame sections 16 and 17 are joined together by a folding brace locking device 31, one strap 32 of which is pivotally secured on pintle 32ª at one end to the lower arm 22 of frame section 16 and the other strap 33 of which is similarly secured on pintle 33ª to the lower arm 23 of frame section 17. The two straps 32 and 33 are pivotally fastened together by pintle 31ª at their free ends.

Figure 1A:
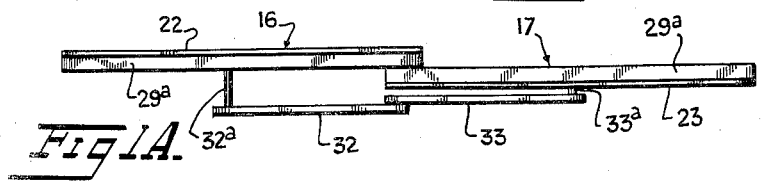
Fig. 1A is a bottom plan view of the ventilating device in an extended position.
Figure 3A:
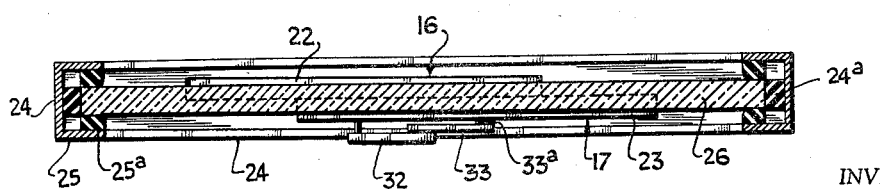
Fig. 3A is a plan sectional view through the window and showing the bottoms of sections of the ventilating device in a retracted position.

As clearly shown in Figs. 3 and 3A, the frame 15 is constructed so that the two sections 16 and 17 are overlapped in the central portion of the frame when the straps 32 and 33 of the folding brace locking device 31 are in their unextended or "folded" position shown in Fig. 3. The sections 16 and 17 are slid in opposite directions by pressing down on the straps 32 and 33 and when the straps are fully extended as shown in Figs. 1, 1A and 2, the two frame sections 16 and 17 have their maximum extended length on window pane 26 with the free end 34 of frame section 16 overlapping the free end 35 of frame section 17.

The lower arm 22 of frame section 16 is provided with a locking pin opening 36 and a similar opening 37 is provided in the strap 32 positioned to align with opening 36 when the strap is in its lower or extended position shown in Fig. 1. A locking pin 38 is inserted in the aligned openings 36 and 37 when the straps 32 and 33 are extended to hold them in this position and keep the frame sections 16 and 17 in their maximum extended overlapping position. A removable channel shaped clamp 39 fits over the straps to shield them and to provide an attractive cover for them.

Various combinations of screens and louvers may be provided in the frame sections. As shown in Figs. 1 to 3 inclusive, a plurality of spaced louvers 40 are secured to each frame section extending across them for disposal cross-wise of a vehicle window. Louvers 40 each have one end secured in channel 30 in one of the ends 20 and 21. In addition, they may be secured as by cement to screens 41 or 42 in frame sections 16 and 17 respectively.

Screens 41 and 42, of copper wire, galvanized wire, mosquito netting, plastic screening or the like, positioned at one side of the louvers 40 are secured in channel 30. The screens may be positioned on the outer facing side of louvers 40 with respect to the interior of vehicle 67 as shown in Figs. 1, 2 and 3 or they may be placed on the inwardly facing side of the louvers. Preferably, they are placed on the outwardly facing side, as shown, so as to present the least possible interference to the induction of air through the louvers.

If a screen only is desired, the louvers may be omitted, as indicated in Fig. 5, and the frame sections can then be formed of two halves 43 and 44 with the screening held therebetween and the halves held together by rivets 45 (only one of which is shown).

The modified form of the invention shown in Fig. 6 is characterized by the provision of a sheet 46 of transparent material adapted to check sun glare. Transparent sheet 46 preferably is of plastic or similar material such as is used in the making of sun glasses. One example of such material is a thermoplastic sheet having light polarizing properties to reduce the glare from the road or other surfaces by removing the plane polarized light present in such reflected light. Polarizing films containing sulphate of iodoquinine, ultramicroscopic needlelike crystals aligned in one direction with the films being held between clear plastic plates may be used, each crystal behaving optically like a thin plate of tourmaline. Two such films placed with their axes at 90° prevent the passage of any appreciable light.

Transparent sheet 46 may be made of any color to provide a restful colored light within the interior of the vehicle.

The transparent sheet 46 has a series of slanting elongated slots 47 through it disposed in the sheet to serve as louvers directing air flow downwardly through the sheet. A mesh screen 48 is positioned at one side of the sheet 46 and held in the frame 49 made in two sections as frame 16 described above.

Frame 49 has two channel openings 50 and 51 separated by a center partition 52. The channel openings 50 and 51 are of the same width and spacer blocks 53 are provided to hold the screen 48 in one of the channels (the screen being shown in channel opening 50 in Fig. 6). By this arrangement, the screen 48 and the sheet 46 are interchangeable in the channel openings.

The modification illustrated in Fig. 7 is characterized by providing a sun glare shielding sheet 54 with a plurality of perforations 55 to admit air, the air being forced to pass through screen 56 to enter the vehicle. Frame 57 holding the mesh screen 56 and perforated sheet 54 are constructed similar to frame 49 of Fig. 6 except that the screen and sheet are not interchangeable, each having their separate channels 58 and 59 respectively.

In the modification shown in Fig. 8, louvers 60 are pivotally connected with the frame 61 being secured to pivot rods 62 pivotally fastened to the frame.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new and desire to secure by United States Letters Patent is:

A ventilating device adapted to be mounted in the window frame runs for the window pane of a motor vehicle window, comprising in combination a frame having two substantially U-shaped frame sections, said frame sections each having two channels facing inwardly, a pair of sheets of transparent light polarizing material respectively secured in one of the channels in each of said frame sections, said sheets each having slots extending therethrough to serve as louvers, a screen section, said sheets each having openings extending therethrough, a pair of mesh screens respectively disposed in the other of said channels in the frame sections, and means for adjustably positioning said frame sections with respect to each other in said window frame, said means including two straps pivotally secured together at one end, the other end of one of said straps being pivotally fastened to one frame section and the other end of the other strap being pivotally fastened to the other frame section, said straps being movable toward or away from each other to slide the frame sections toward or away from each other to reduce or increase the overall length of the frame sections, said straps being pivoted by exerting manual pressure on said one end thereof.

References Cited in the file of this patent
UNITED STATES PATENTS

| | | |
|---|---|---|
| 916,752 | Mitchell | Mar. 30, 1909 |
| 1,070,792 | Ferneau | Aug. 19, 1913 |
| 1,305,920 | Miller | June 3, 1919 |
| 1,509,569 | Swanson | Sept. 23, 1924 |
| 1,532,769 | McElroy | Apr. 7, 1925 |
| 1,608,785 | Evans | Nov. 30, 1926 |
| 1,798,600 | Gooch | Mar. 31, 1931 |
| 1,871,557 | Racy | Aug. 16, 1932 |
| 1,906,237 | Pausha et al. | May 2, 1933 |
| 1,914,228 | Woodruff | June 13, 1933 |
| 1,986,700 | Zimmerman | Jan. 1, 1935 |
| 2,448,671 | Hord | Sept. 7, 1948 |
| 2,484,769 | Wolters | Oct. 11, 1949 |
| 2,557,442 | Kurilo | June 19, 1951 |
| 2,580,663 | Delf et al. | Jan. 1, 1952 |